United States Patent
Gagné et al.

(10) Patent No.: US 7,063,395 B2
(45) Date of Patent: Jun. 20, 2006

(54) LATERALLY REINFORCED ENDLESS BELT TRACK

(75) Inventors: Lucie Gagné, Sherbrooke (CA); Alain Lussier, St-Francois-Xavier-de-Brompton (CA)

(73) Assignee: Camoplast Inc., Sherbrooke (CA)

( * ) Notice: Subject to any disclaimer, the term of this patent is extended or adjusted under 35 U.S.C. 154(b) by 130 days.

(21) Appl. No.: 10/779,264

(22) Filed: Feb. 13, 2004

(65) Prior Publication Data

US 2004/0174069 A1 Sep. 9, 2004

(51) Int. Cl.
*B62D 55/24* (2006.01)

(52) U.S. Cl. ............................ 305/170; 305/167
(58) Field of Classification Search .............. 305/165, 305/166, 167, 170, 171
See application file for complete search history.

(56) References Cited

U.S. PATENT DOCUMENTS

| | | | |
|---|---|---|---|
| 2,515,128 A * | 7/1950 | Lammertse | 305/181 |
| 3,554,310 A | 1/1971 | Dieffenbach | |
| 3,582,154 A | 6/1971 | Russ | |
| 3,623,780 A | 11/1971 | Kell | |
| 3,734,576 A | 5/1973 | Heiple et al. | |
| 4,056,288 A | 11/1977 | Stedman | |
| 4,407,550 A * | 10/1983 | Lapsys | 305/166 |
| 4,548,315 A | 10/1985 | Briggs | |
| 4,721,498 A | 1/1988 | Grob | |
| 4,825,969 A | 5/1989 | King et al. | |
| 5,130,193 A * | 7/1992 | Ikeda | 428/365 |
| 5,161,866 A * | 11/1992 | Johnson | 305/136 |
| 5,354,124 A | 10/1994 | James | |
| 5,363,936 A * | 11/1994 | Grawey et al. | 180/9.21 |
| 5,429,429 A | 7/1995 | Loegering et al. | |
| 5,511,869 A | 4/1996 | Edwards et al. | |
| 6,010,199 A | 1/2000 | Hoffart | |
| 6,193,335 B1 | 2/2001 | Edwards | |
| 6,196,646 B1 | 3/2001 | Edwards | |
| RE37,174 E | 5/2001 | Grawey et al. | |
| 6,296,329 B1 | 10/2001 | Rodgers et al. | |
| 6,386,652 B1 | 5/2002 | Bonko | |
| 2002/0033643 A1 | 3/2002 | Soucy et al. | |
| 2002/0067074 A1 | 6/2002 | Katayama et al. | |
| 2002/0145335 A1 | 10/2002 | Soucy et al. | |

FOREIGN PATENT DOCUMENTS

| | | |
|---|---|---|
| CA | 2 196 355 A1 | 7/1998 |
| CA | 2 337 466 A1 | 2/2002 |
| CA | 2 319 934 A1 | 3/2002 |
| CA | 2 319 937 A1 | 3/2002 |
| EP | 0 451 716 B1 | 1/1995 |
| EP | 1 197 515 A1 | 4/2002 |
| WO | WO 00/55032 | 9/2000 |
| WO | WO 01/89913 A1 | 11/2001 |

* cited by examiner

OTHER PUBLICATIONS

N.V. Bekaert S.A. publication dated Aug. 1991, p. 6, Introduction pg., p. 19, p. 25, p. 125, p. 133.

*Primary Examiner*—Russell D. Stormer
(74) *Attorney, Agent, or Firm*—Quarles & Brady LLP

(57) ABSTRACT

There is provided an endless track belt laterally reinforced by embedding high elongation cords on each peripheral sides of the endless track belt to prevent cuts formed on the periphery of the belt by sharp objects from propagating further towards the inner width of the endless track belt.

9 Claims, 1 Drawing Sheet

LATERALLY REINFORCED ENDLESS BELT TRACK

FIELD OF THE INVENTION

The present invention relates to tracked vehicles. More specifically, the present invention is concerned with a laterally reinforced endless belt track.

BACKGROUND OF THE INVENTION

Skid steer loader tracks are oftentimes made with materials that are liable to be cut by rocks or other sharp objects on each side thereof during skidding. This is to be prevented since small cracks can propagate very fast due to the track tension and the material weakness against lateral tear.

SUMMARY OF THE INVENTION

There is provided an endless belt for a tracked vehicle, comprising a body and at least one side cord running along a length of the body, buried in a thickness of a material thereof in at least one peripheral part thereof; the at least one side cord stopping cracks that may initiate on the at least one peripheral part of the endless belt from propagating.

There is further provided a skid steer loader provided with an endless belt provided with traction lugs on a ground-engaging surface thereof, comprising at least one side cord running peripherally along a length thereof and embedded inside a thickness of a material thereof away from a position of the traction lugs in at least one peripheral part of the endless belt.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

Generally stated, there is provided an endless track belt laterally reinforced by inserting cords or cables on each sides of the endless track belt, thereby preventing cuts formed on these sides by sharp objects to propagate further towards an inner width of the endless track belt.

Figure 1:
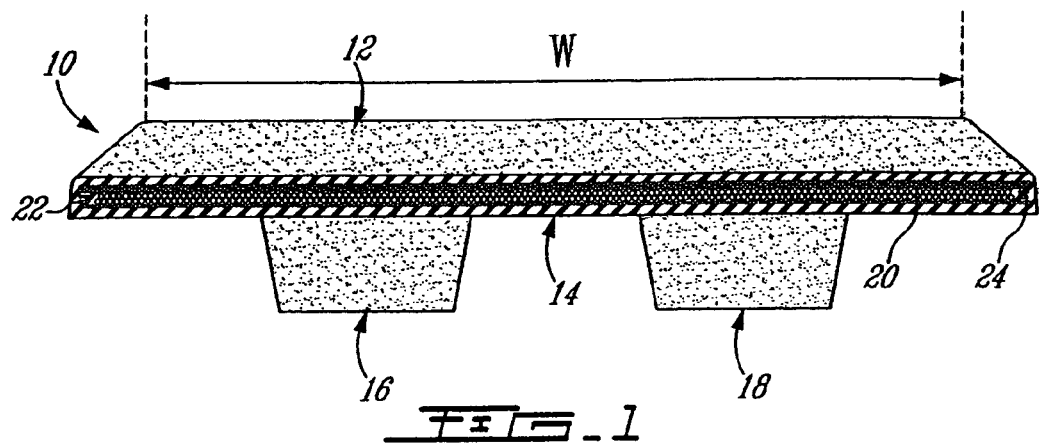
FIG. 1 is an overall transversal section view of a reinforced track according to an embodiment of the present invention.
Figure 2:
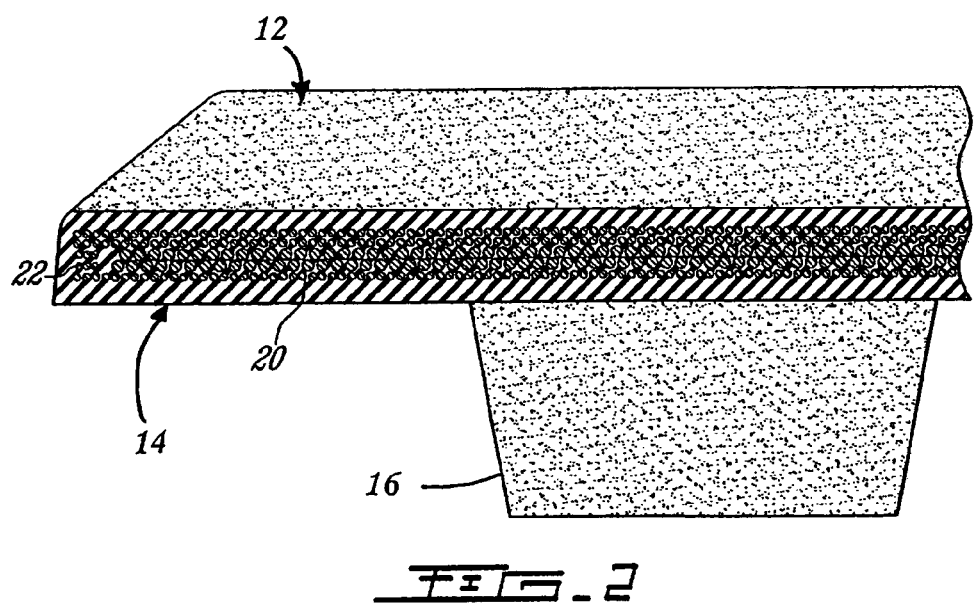
FIG. 2 is a close-up view of FIG. 1.

As illustrated in FIG. 1, an endless belt track 10 comprises a body having an inner surface 12 and an outer surface 14.

The outer surface 14 provided with traction lugs 16, 18 projecting therefrom at intervals, along a longitudinal direction of endless belt track 10, for engaging the ground to be travelled across (not shown).

Typically, the endless belt track 10 is made of a resilient material such as rubber for example, and may be provided with circumferential tensile members 20 extending longitudinally along a length of the endless belt and buried in rows across the width W of the belt to enhance rigidity of the track 10.

Layers of cords 22, 24 are further provided along the sides of, and are spaced an internal width dimension W of, the endless track belt 10. They extend in a direction of the length of the endless track belt 10, buried in the thickness of the material of endless track belt 10, on each peripheral part thereof, thereby stopping any crack that may initiate on the periphery of the endless track belt 10 due to an impact with a sharp object for example, and preventing such a crack from propagating any further towards the inner width of the endless track belt 10.

It is found that a limited number of such side cords 22, 24 is sufficient to compensate for a weakness of the belt on the peripheral regions thereof away from the position of the lugs 16, 18, and to prevent a separation of the material, such as rubber, of the belt in the widthwise direction, while not decreasing the lateral bending capacity of the track nor the riding comfort. The side cords are inserted into the thickness of the material of the belt 10 at such a depth therein so that they do not get exposed at the surface of the belt 10, which may damage them and may result in delamination of the belt and water penetration therein.

Side cords 22, 24 are high elongation cords such as, for example, twisted-strand cable made in steel.

People in the art will appreciate that the present invention allows an increased lifetime of tracks for such tracked vehicle as skid steer loader tracks for example.

Although the present invention has been described hereinabove by way of embodiments thereof, it can be modified, without departing from the teachings and nature of the subject invention as defined herein.

The invention claimed is:

1. An endless belt for a tracked vehicle, comprising:
   a body; and
   at least one side cord running along a length of said body, buried in a thickness of a material thereof in at least one peripheral part thereof; said at least one side cord stopping cracks that may initiate on said at least one peripheral part of the endless belt from propagating,
   wherein said at least one side cord is a high elongation steel cable.

2. The endless belt according to claim 1, wherein said at least one lateral cord is made of a twisted-strand cable.

3. The endless belt according to claim 1, wherein there are provided a plurality of side cords of high elongation steel cable running along at least one side of the belt.

4. The endless belt according to claim 1, further comprising at least one circumferential tensile member extending longitudinally along a length thereof away from said at least one side cord.

5. The endless belt according to claim 1 for use in a skid steer loader.

6. A skid steer loader provided with an endless belt provided with traction lugs on a ground-engaging surface thereof, comprising at least one side cord running peripherally along a length thereof and embedded inside a thickness of a material thereof away from a position of the traction lugs in at least one peripheral part of the endless belt, wherein said at least one side cord is a high elongation steel cable.

7. The skid steer loader according to claim 6, wherein said at least one lateral cord is made of a twisted-strand cable.

8. The skid steer loader according to claim 6, wherein there are provided a plurality of side cords of high elongation steel cable running along at least one side of the belt.

9. The skid steer loader according to claim 6, wherein said endless belt further comprises at least one circumferential tensile member extending longitudinally along a length thereof away from said at least one side cord.

* * * * *